US008549708B1

(12) United States Patent
Kim et al.

(10) Patent No.: US 8,549,708 B1
(45) Date of Patent: Oct. 8, 2013

(54) LONG STROKE TILTING HINGE MODULE FOR PORTABLE TERMINAL

(75) Inventors: Young Ho Kim, Chilgok-gun (KR); Se Kyu Kim, Gumi-si (KR); Hee Choun Lee, Suwon-si (KR)

(73) Assignee: Khvatec Co., Ltd. (KR)

( * ) Notice: Subject to any disclaimer, the term of this patent is extended or adjusted under 35 U.S.C. 154(b) by 0 days.

(21) Appl. No.: 13/542,105

(22) Filed: Jul. 5, 2012

(51) Int. Cl.
*H04M 1/00* (2006.01)
*E05F 1/08* (2006.01)

(52) U.S. Cl.
USPC .......... 16/302; 16/239; 16/286; 16/342; 455/575.4; 361/679.01

(58) Field of Classification Search
USPC .......... 16/330, 302, 303, 357, 360, 361, 16/366, 239, 286, 342; 455/575.3, 90.3; 361/679.04, 679.06, 379.07, 679.1, 679.18, 361/679.19, 679.2, 679.28, 679.27; 379/433.11, 379/433.13
See application file for complete search history.

(56) References Cited

U.S. PATENT DOCUMENTS

| | | | | |
|---|---|---|---|---|
| 1,898,161 | A * | 2/1933 | Arnold | 16/361 |
| 2,132,266 | A * | 10/1938 | Lefevre | 16/361 |
| 4,610,049 | A * | 9/1986 | Dean | 16/286 |
| 5,168,426 | A * | 12/1992 | Hoving et al. | 361/679.09 |
| 5,742,475 | A * | 4/1998 | Riddiford | 361/679.09 |
| 7,158,634 | B2 * | 1/2007 | Eromaki | 379/433.13 |
| 7,726,616 | B2 * | 6/2010 | Zhang et al. | 248/284.1 |
| 7,925,310 | B2 * | 4/2011 | Chiu | 455/575.1 |
| 7,929,284 | B2 * | 4/2011 | Shen | 361/679.21 |
| 8,068,334 | B2 * | 11/2011 | Tang | 361/679.27 |
| 8,081,449 | B2 * | 12/2011 | Lin et al. | 361/679.56 |
| 8,108,017 | B2 * | 1/2012 | Jang et al. | 455/575.4 |
| 8,154,768 | B2 * | 4/2012 | Muraki | 358/296 |
| 8,154,868 | B2 * | 4/2012 | Xu | 361/679.55 |
| 8,190,219 | B2 * | 5/2012 | Park et al. | 455/575.4 |
| 8,200,300 | B2 * | 6/2012 | Wang et al. | 455/575.4 |
| 8,233,276 | B2 * | 7/2012 | Wu et al. | 361/679.55 |
| 8,248,788 | B2 * | 8/2012 | Wu et al. | 361/679.55 |
| 8,259,443 | B2 * | 9/2012 | Wu et al. | 361/679.56 |
| 8,265,719 | B2 * | 9/2012 | Lindvall | 455/575.4 |
| 8,296,906 | B2 * | 10/2012 | Wisniewski | 16/370 |
| 8,300,394 | B2 * | 10/2012 | Senatori | 361/679.27 |
| 8,306,584 | B2 * | 11/2012 | Yeh et al. | 455/575.4 |
| 8,306,586 | B2 * | 11/2012 | Ou et al. | 455/575.4 |
| 8,307,510 | B2 * | 11/2012 | Chuang et al. | 16/364 |
| 8,315,044 | B2 * | 11/2012 | Wu et al. | 361/679.02 |
| 8,346,322 | B2 * | 1/2013 | Yoon | 455/575.4 |
| 8,363,391 | B2 * | 1/2013 | Kim et al. | 361/679.01 |
| 8,364,215 | B2 * | 1/2013 | Jung et al. | 455/575.4 |
| 8,369,104 | B2 * | 2/2013 | Kim et al. | 361/814 |

(Continued)

*Primary Examiner* — Victor Batson
*Assistant Examiner* — Jason W San
(74) *Attorney, Agent, or Firm* — Cantor Colburn LLP

(57) ABSTRACT

A long stroke tilting hinge module for the portable terminal includes a main body which is vertically formed with an elongated hole-shaped moving hole; a cover which is slid and tilted on an upper surface of the main body; a main lever of which one end is hinged to the main body and the other end is rotatably hinged to the cover; a sub-lever of which one end is hinged to the main body and the other end is rotatably hinged to the cover; a moving shaft which is inserted into the moving hole so that one end of the sub-lever is hinged to the main body; a cam which is coupled to the moving shaft; a support member which is coupled to the main body and contacted with an outer surface of the cam; and a spring which presses the moving shaft toward the support member.

3 Claims, 9 Drawing Sheets

(56) References Cited

U.S. PATENT DOCUMENTS

| | | | |
|---|---|---|---|
| 8,385,993 B2* | 2/2013 | Pirttilahti et al. | 455/575.4 |
| 2002/0077161 A1* | 6/2002 | Eromaki | 455/575 |
| 2008/0304215 A1* | 12/2008 | Chiu | 361/681 |
| 2009/0227301 A1* | 9/2009 | Lindvall | 455/575.4 |
| 2010/0061049 A1* | 3/2010 | Shen | 361/679.21 |
| 2011/0013350 A1* | 1/2011 | Tracy et al. | 361/679.21 |
| 2011/0111813 A1* | 5/2011 | Yoon | 455/575.4 |
| 2011/0157784 A1* | 6/2011 | Wu et al. | 361/679.01 |
| 2011/0157786 A1* | 6/2011 | Wu et al. | 361/679.01 |
| 2011/0170245 A1* | 7/2011 | Wu et al. | 361/679.01 |
| 2011/0175507 A1* | 7/2011 | Wu et al. | 312/309 |
| 2011/0176262 A1* | 7/2011 | Wu et al. | 361/679.01 |
| 2011/0182011 A1* | 7/2011 | Kim et al. | 361/679.01 |
| 2011/0188183 A1* | 8/2011 | Wu et al. | 361/679.01 |
| 2011/0258811 A1* | 10/2011 | Borkgren et al. | 16/319 |
| 2011/0263304 A1* | 10/2011 | Laido et al. | 455/575.3 |
| 2012/0047686 A1* | 3/2012 | Hautamaki et al. | 16/366 |
| 2012/0170183 A1* | 7/2012 | Wu et al. | 361/679.01 |
| 2012/0170186 A1* | 7/2012 | Wu et al. | 361/679.01 |
| 2012/0188703 A1* | 7/2012 | Yang et al. | 361/679.27 |
| 2012/0222268 A1* | 9/2012 | Yamaguchi | 16/302 |
| 2012/0291224 A1* | 11/2012 | Chang | 16/302 |
| 2012/0300381 A1* | 11/2012 | Hung et al. | 361/679.09 |
| 2013/0016489 A1* | 1/2013 | Yeh et al. | 361/807 |
| 2013/0044414 A1* | 2/2013 | Peng | 361/679.01 |

* cited by examiner (a)

(b)

(c)

(a)

A-A (b)

(a)

(b)

(a)

(b)

B-B (a)

(b)

(c)

LONG STROKE TILTING HINGE MODULE FOR PORTABLE TERMINAL

BACKGROUND OF THE INVENTION

1. Field of the Invention

The present invention relates to a long stroke tilting hinge module for a portable terminal, and more particularly, to a long stroke tilting hinge module for a portable terminal, which is provided at the portable terminal so that a cover is slid backwards against a main body and then tilted forward.

2. Description of Related Art

Generally, a personal portable terminal can be classified into a flip type, a folder type and a sliding type.

The sliding type portable terminal includes a main body, and a cover which is disposed at the upper side of the main body so as to open and close an upper surface of the main body. A sliding module for sliding the cover is provided between the main body and the cover.

However, in the slide type portable terminal, while the main body is opened, the cover is disposed to be horizontal with respect to the main body. Therefore, when a user watches an image through a liquid crystal display part, it is necessary to slightly tilt the liquid crystal display part toward the user.

To solve the problem, there has been recently proposed a tilting hinge module for tilting the cover forward when the cover is slid backwards.

FIG. 1a is a view showing a structure of a portable terminal in which a conventional tilting hinge module is installed, and FIGS. 1b and 1c are views showing operations of the portable terminal in which the conventional tilting hinge module is installed.

As shown in FIG. 1a, the conventional tilting hinge module includes a first link member 3 and a second link member 4.

One end of the first link member 3 is rotatably hinged to a main body 1, and the other end thereof is rotatably hinged to the cover 2.

The second link member 4 is disposed at the front side of the first link member 3. The second link member 4 is shorter than the first link member 3.

Further, one end of the second link member 4 is rotatably hinged to a main body 1, and the other end thereof is rotatably hinged to the cover 2.

As shown in FIG. 1b, 1f the cover 2 is slid backwards, each one end of the first and second link members 3 and 4 is rotated backwards, and the cover 2 is lifted up toward the upper side of the main body 1 and thus spaced apart from the main body 1.

Herein, a rear portion of the cover 2 is lifted up more than a front portion thereof, and thus the cover is tilted toward the front side.

Then, if the first and second link members 3 and 4 are further rotated backwards, as shown in FIG. 1c, the cover 2 is slid backwards and then further tilted.

However, in the conventional tilting hinge module, the positions of the first and second link members 3 and 4 are respectively fixed, and thus it is limited to extend a sliding section L of the cover 2.

Further, when the cover 2 is slid, a jumping space H which is a distance in a vertical direction between one end of the cover 2 and the main body 10 when the cover 2 is slid, is widened too much, and the inside thereof is exposed to the outside. Thus, there is another problem that it external appearance is deteriorated.

SUMMARY OF THE INVENTION

An embodiment of the present invention is directed to providing a long stroke tilting hinge module for a portable terminal, which can minimize the jumping space generated upon sliding of the cover, so that it is prevented the inside thereof is exposed to the outside, and also which can extend an opened surface of the main body so as to provide a wide surface area for keyboard.

To achieve the object of the present invention, the present invention provides a long stroke tilting hinge module for a portable terminal, including a main body which is formed with an upwardly and downwardly elongated hole-shaped moving hole; a cover which is slid and tilted on an upper surface of the main body; a main lever of which one end is hinged to the main body and the other end is rotatably hinged to the cover; a sub-lever of which one end is hinged to the main body so as to be rotatable and movable up and down and the other end is rotatably hinged to the cover; a moving shaft which is inserted into the moving hole so that one end of the sub-lever is hinged to the main body; a cam which is coupled to a longitudinal center portion of the moving shaft; a support member which is fixed to the main body and disposed at the lower side of the cam and of which an outer surface is contacted with the cam; and a spring which is contacted with the moving shaft and which downwardly presses the moving shaft so that the cam is contacted to the outer surface of the support member, wherein the cam comprises a first cam surface which is formed into a curved shape and a second cam surface which is extended from the first cam surface and formed into a curved shape having a smaller diameter than the first cam surface, and the first cam surface is contacted with the outer surface of the support member when the cover is disposed at the upper side of the main body, and when the cover is slid to the rear side of the main body, each one end of the main lever and the sub-lever and the cam are rotated in one direction, the second cam surface is contacted with the outer surface of the support member, the moving shaft is moved down along the moving hole together with one end of the sub-lever by elastic force of the spring, and thus a jumping space of the cover is reduced.

Preferably, when the cover is slid to the rear side of the main body and a front portion of the cover is passed through a maximal jumping space, the cam is rotated in one direction and the first cam surface is contacted with an outer surface of the support member, and thus one end of the sub-lever is moved up and an opened surface of the main body is increased.

Preferably, the long stroke tilting hinge module further includes a rotational module which is installed at one end of the main lever so as to provide rotational force to the main lever when the main lever is rotated at a desired angle or more, wherein the rotational module includes a housing which is fixed to the main body; a rotational cam of which one end is fixed to one end of the main lever and the other end is rotatably inserted into the housing and formed with a corrugated rotational cam surface; a fixed cam which is installed at the housing so as to be slid left and right and formed with a corrugated fixed cam surface engaged with the corrugated rotational cam surface; and a pressing spring which is installed at the housing and of which one end is contacted with the housing and the other end is contacted with the fixed cam so as to elastically press the fixed cam toward the rotational cam, and wherein, if one end of the main lever is rotated together with the rotational cam at a desired angle or more in one direction, the rotational force is provided to the main lever and the rotational cam by the elastic force of the pressing spring and phase difference between the rotational cam surface and the fixed cam surface.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
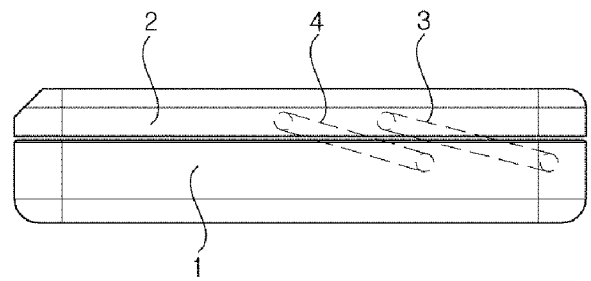
FIG. 1 is a view showing the structure of a conventional tilting hinge module for a portable terminal.
Figure 1:
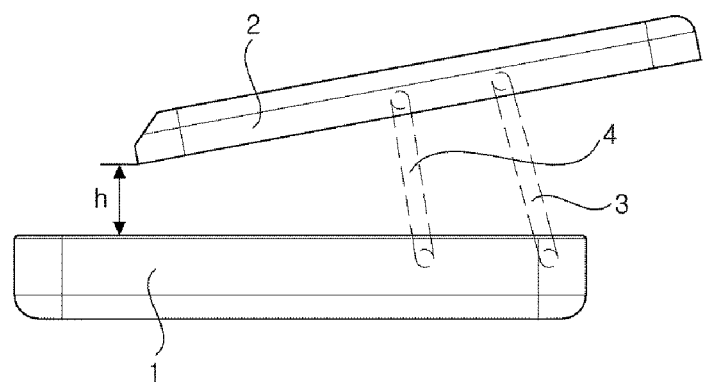
Figure 1:
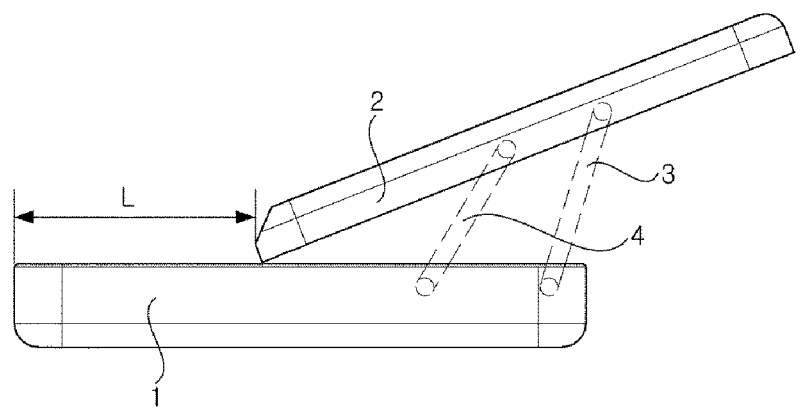
Figure 2:
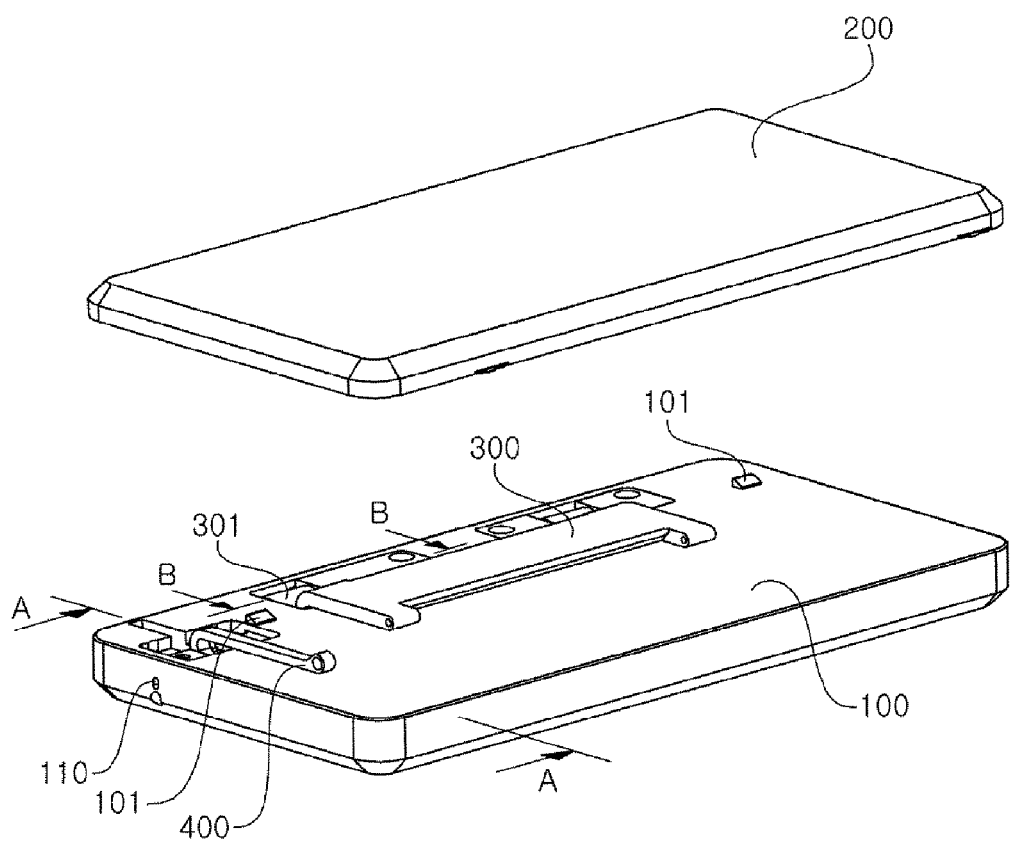
FIG. 2 is an exploded perspective view of a long stroke tilting hinge module for a portable terminal according to an embodiment of the present invention, wherein a cover is separated.
Figure 3:
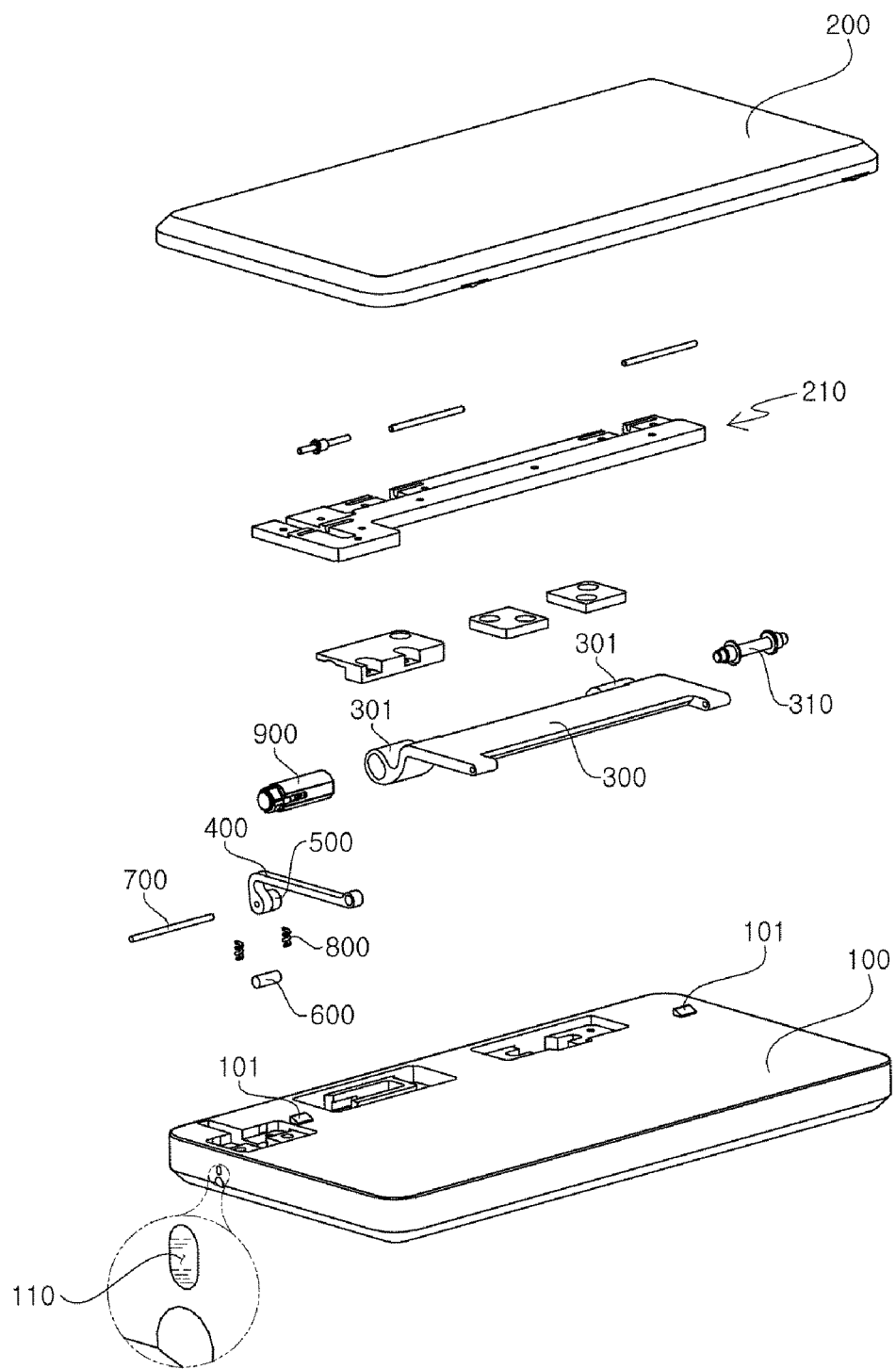
FIG. 3 is an exploded perspective view of one side of the long stroke tilting hinge module for the portable terminal according to the embodiment of the present invention.
Figure 4:
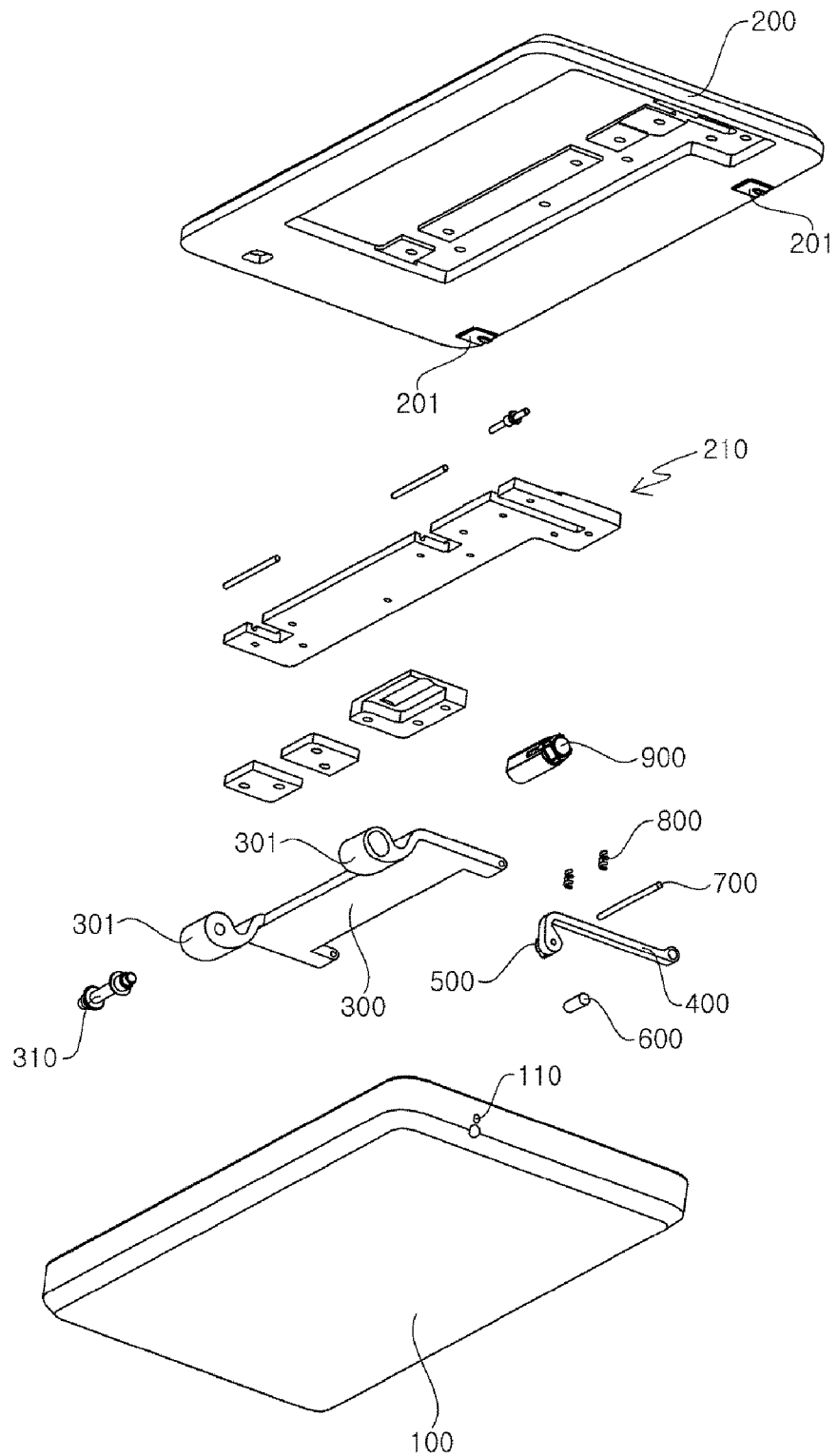
FIG. 4 is an exploded perspective view of the other side of the long stroke tilting hinge module for the portable terminal according to the embodiment of the present invention.
Figure 5:
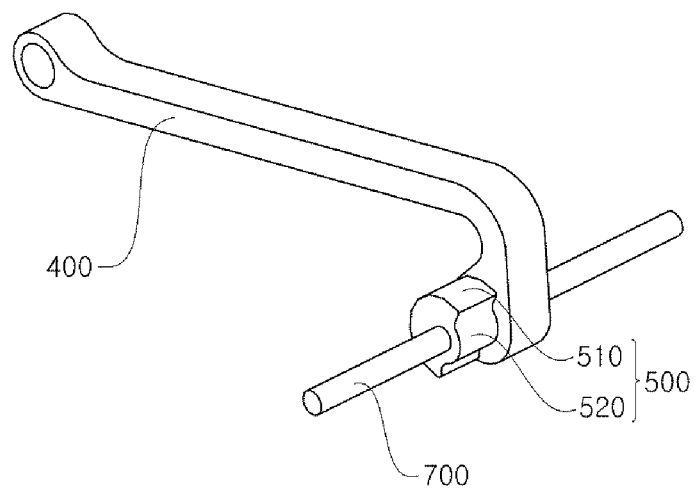
FIG. 5 is an enlarged perspective view of a sub-lever according to the embodiment of the present invention.
Figure 6:
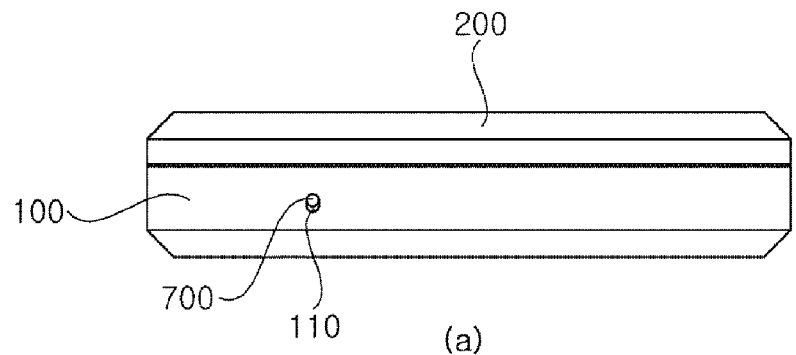
FIGS. 6 to 8 are views showing operations of main parts of the long stroke tilting hinge module for the portable terminal according to the embodiment of the present invention.
Figure 6:
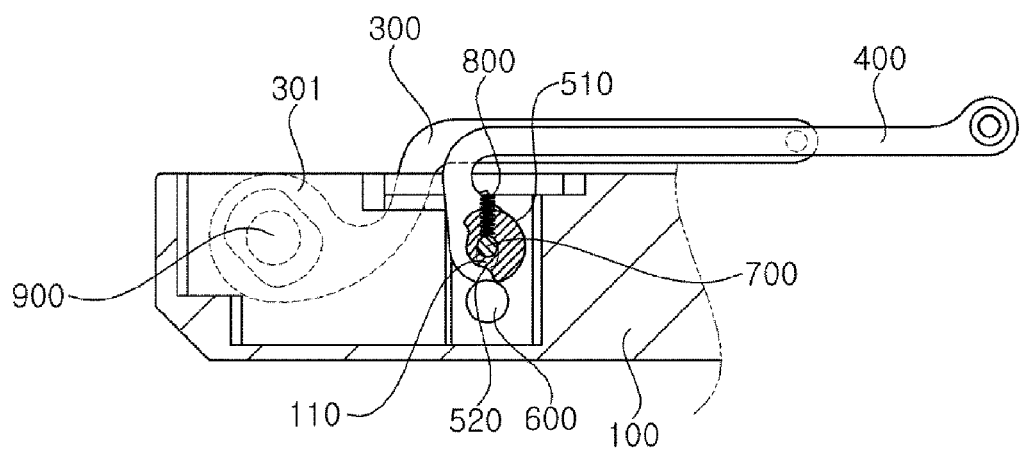
Figure 7:
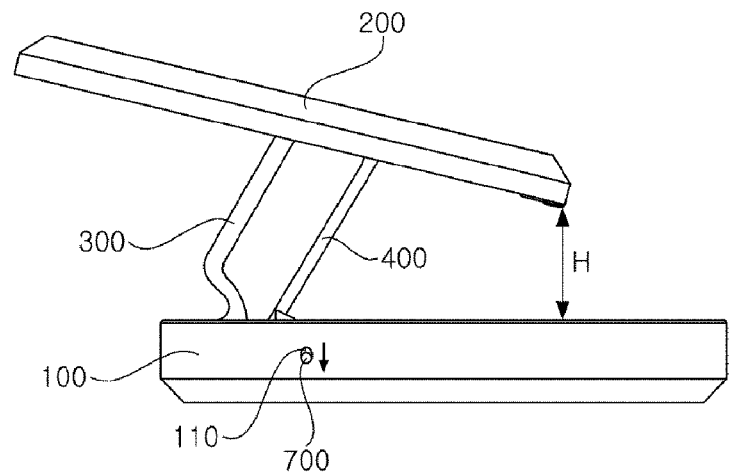
Figure 7:
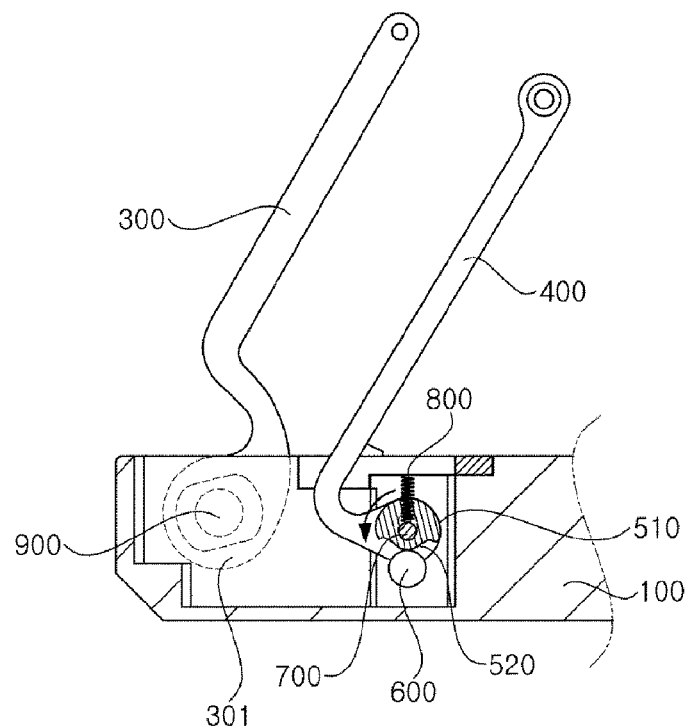
Figure 8:
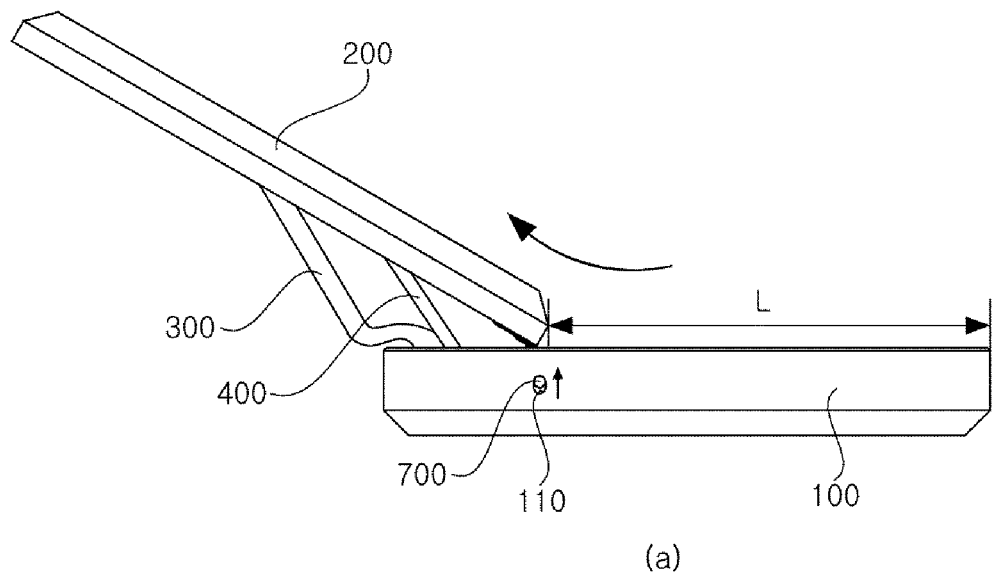
Figure 8:
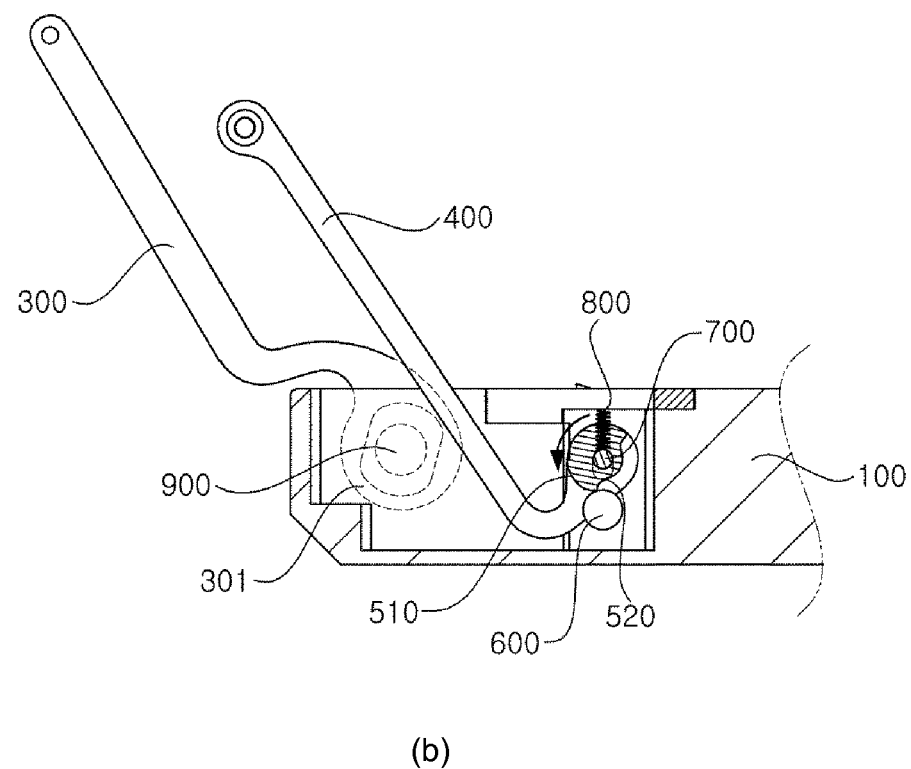
Figure 9:
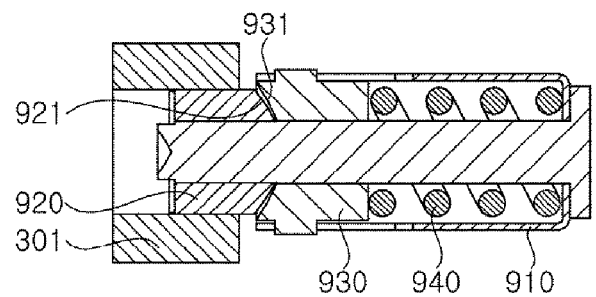
FIG. 9 is a view showing an operation of a rotational module according to the embodiment of the present invention.
Figure 9:
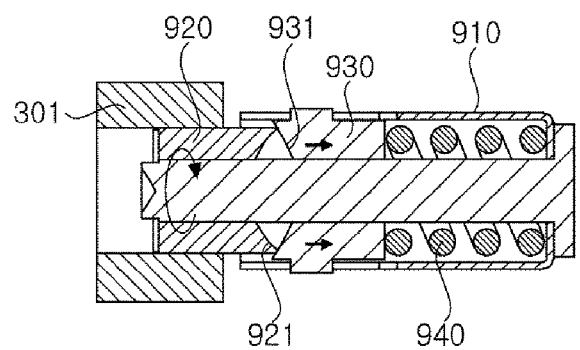
Figure 9:
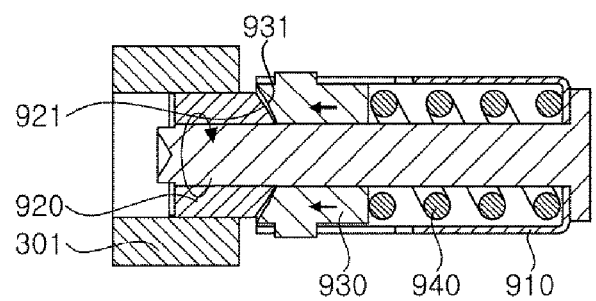

FIG. 2 is an exploded perspective view of a long stroke tilting hinge module for a portable terminal according to an embodiment of the present invention, wherein a cover is separated, FIG. 3 is an exploded perspective view of one side of the long stroke tilting hinge module for the portable terminal according to the embodiment of the present invention, FIG. 4 is an exploded perspective view of the other side of the long stroke tilting hinge module for the portable terminal according to the embodiment of the present invention, FIG. 5 is an enlarged perspective view of a sub-lever according to the embodiment of the present invention, FIGS. 6 to 8 are views showing operations of main parts of the long stroke tilting hinge module for the portable terminal according to the embodiment of the present invention, and FIG. 9 is a view showing an operation of a rotational module according to the embodiment of the present invention.

As shown in FIGS. 2 to 9, a long stroke tilting hinge module for a portable terminal according to an embodiment of the present invention includes a main body 100, a cover 200, a main lever 300, a sub-lever 4000, a cam 500, a support member 600, a moving shaft 700, a spring 800 and a rotational module 900.

As shown in FIG. 2, the main body 100 is formed into a rectangular shape and also formed with a support protrusion 101 and a moving hole 110.

The support protrusion 101 is protruded on the main body 100 so as to have a square shape, and an upper surface thereof is tilted to be gradually higher toward the rear side.

When the cover 200 is completely opened from the upper surface of the main body 100, the support protrusion 101 is contacted with a frictional member 201 of the cover 100, as described later.

The moving hole 110 formed in the main body 100 is formed into an elongated hole in the vertical direction so that the moving shaft 700 can be inserted therein, as described later.

More detailedly, as shown in FIGS. 2 to 4, the moving hole 110 is formed in a side surface of the main body 100 so as to be exposed to the outside, and the moving shaft 700 is inserted therein.

Due to the moving hole 110, the sub-lever 400 can be easily coupled with the moving shaft 700.

As described above, the main body 100 may be a main body itself of the portable terminal or may be coupled to an upper surface of the main body of the portable terminal.

In case that the main body 100 is the main body itself of the portable terminal, a keyboard is disposed on the upper surface of the main body 100.

As described later, a groove in which an end of the main lever 300 and an end of the sub-lever 400 are inserted and hinged is formed in the upper surface of the main body 100.

The cover 200 is installed so as to be tilted when being slid backwards against the main body 100.

As shown in FIG. 2, the cover 200 is formed into a rectangular shape corresponding to the upper surface of the main body 100.

The cover 200 may be a cover itself of the portable terminal, or may be provided at a lower surface of the cover of the portable terminal.

In case that the cover 200 is the cover itself of the portable terminal, a liquid crystal display part is provided on the upper surface thereof.

The frictional member 201 which is contacted with the support protrusion 101 of the main body 100 is disposed at the lower side of the cover 200.

As shown in FIG. 4, the frictional member 201 is formed into a square shape and disposed at the lower both sides of the cover 200.

When the cover 200 is completely opened from the upper surface of the main body 100, the frictional member 201 is contacted with the support protrusion 101 of the main body 100, thereby reducing shock and noise generated by the friction.

The main lever 300 is formed into a rectangular shape, and one end of the main lever 300 is hinged to a rear groove based on the center portion of the main body 100, and the other end thereof is rotatably hinged to the lower surface of the cover 200.

More detailedly, as shown in FIGS. 2 to 4, the main lever 300 is formed into a rectangular shape, and one end of the main lever 300 which is coupled to the main body 100 is formed with a cylindrical hinge coupler 301.

The hinge coupler 301 consists of two parts which is spaced apart from each other.

The hinge coupler 301 which is installed at one side is disposed at one side of the upper surface of the main body 100 and also rotatably hinged to the main body 100 by using a rotational shaft 310.

The hinge coupler 301 which is installed at the other side is disposed at the other side of the upper surface of the main body 100 and also rotatably hinged to the main body by using the rotational module 900.

As shown in FIGS. 3 and 4, the other end of the main lever 300 is rotatably hinged to the cover 200 by using a coupling member 210.

In some cases, the main lever 300 may be formed into an elongated link shape, and then one end of the link-shaped main lever 300 may be rotatably hinged to the main body 100 by using only the rotational module 900.

The sub-lever 400 is formed into an elongated link shape and disposed at the front side of the main lever 300, as shown in FIGS. 6 to 8. One end of the sub-lever 400 is hinged to a groove of the main body 100 so as to be rotatable and movable up and down, and the other end thereof is rotatably hinged to the cover 200.

More detailedly, a cam 500 is formed at one end of the sub-lever 400, as described later, and the moving shaft 700 is formed at a rotational center of the cam 500 and the one end of the sub-lever. The moving shaft 700 is inserted into the moving hole 110 and hinged to the main body 100 so as to be rotatable and movable up and down.

That is, since the moving shaft 700 is inserted into the moving hole 110 formed into the elongated hole, the one end of the sub-lever 400 and the cam 500 are coupled with the main body 100 so as to be rotatable and movable up and down.

Herein, as shown in FIGS. 6 to 8, the one end of the sub-lever 400, i.e., the moving shaft 700 is arranged at the front side of the rotational center of the rotational module 300.

And as shown in FIGS. 3 and 4, the other end of the sub-lever is rotatably hinged to the cover 200 through the coupling member 210.

In the one end of the sub-lever which is hinged to the main body 100 through the moving shaft 700, since the moving shaft 700 inserted into the moving hole 110 is moved up and down, it is possible to reduce a jumping space H formed at the front side of the cover 200 which is slidably opened and closed on the upper surface of the main body 100.

The moving shaft 700 is inserted into the moving hole 110, and thus the one end of the sub-lever 400 is allowed to be hinged to the main body 100.

More detailedly, the moving shaft 700 is inserted into the moving hole 110 formed at the side surface of the main body 100, such that the one end of the sub-lever 400 is hinged to the main body 100.

The moving shaft 700 is moved up and down along the moving hole 110 vertically formed into the elongated hole shape, and thus the one end of the sub-lever 400 is coupled to the main body to be rotatable and movable up and down.

The cam 500 is coupled to the rotational center of the moving shaft 700.

The one end of the sub-lever 400 may formed into the cam shape and thus used as the cam 500. Alternatively, the one end of the sub-lever 400 and the cam 500 may be disposed at the moving shaft so as to be spaced apart from each other.

Preferably, the cam 500 is integrally formed at the side surface of the sub-lever 400 and then coupled with the moving shaft 700, as shown in FIG. 5.

The cam 500 consists of a semicircular first cam surface 510 and a second cam surface 520.

The second cam surface 520 is extended from the first cam surface 510 and selectively contacted with the support member 600, as described later.

And as shown in FIGS. 6 to 8, the first cam surface 510 has a larger diameter than the second cam surface 520.

The one end of the sub-lever 400 can be moved up and down by the first and second cam surfaces 510 and 520.

The support member 600 is installed at the main body 100 so as to be contacted with an external surface of the cam 500.

More detailedly, the support member 600 is provided at the lower side of the cam 500 so as to be selectively contacted with the first and second cam surfaces 510 and 520 by elastic force of a spring 800.

As shown in FIGS. 6 to 8, the spring 800 is disposed at the upper side of the moving shaft 700 so as to press down the moving shaft 700.

As described above, since the spring 800 presses down the moving shaft 700 in the moving hole 110, the cam 500 is always contacted with the support member 600.

Herein, the up and down movement of the moving shaft 700 and the one end of the sub-lever 400 is achieved by the selective contact between the support member 40 and the first and second cam surfaces 510 and 520 of the cam 500 pressed by the spring 800.

Different from the embodiment, the spring 800 may be disposed at the lower side of the moving shaft 700. In this case, each position of the first and second cam surfaces 510 and 520 of the cam 500 coupled with the moving shaft 700 is changed reversely, and the support member 600 contacted with the outer surface of the cam 500 is disposed at the upper side of the cam 500, and the one end of the sub-lever 400 is moved up and down by rotation of the main lever 300.

Meanwhile, one end of the rotational module 900 is installed at the main body 100, and the other end thereof is installed at the main lever 300 so as to provide rotational force to the main lever 300.

More detailedly, as shown in FIG. 9, the rotational module 900 includes a housing 910, a rotational cam 920, a fixed cam 930 and a pressing spring 940.

The housing 910 is fixed to the main body 100 and disposed at the other side of the main body.

One end of the rotational cam 920 is fixed to one end of the main lever 300, and the other end thereof is rotatably inserted into the housing 910.

And a corrugated rotational cam surface 921 is formed at the other end of the rotational cam 920.

The fixed cam 930 is slidably installed at the housing 910.

A corrugated fixed cam surface 931 which is engaged with the corrugated rotational cam surface 921 is formed at one end of the fixed cam 930 toward the rotational cam 920.

The pressing spring 940 is installed at the housing 910 and contacted with the other end of the fixed cam 930 so as to elastically press the fixed cam 930 toward the rotational cam 920.

As the cover 400 is slid to the rear side and thus the main lever 300 is rotated, the pressing spring 940 is compressed and then expanded by the interaction between the rotational cam 920 and the fixed cam 930, thereby providing rotational force to the main lever 300.

If the main lever 300 is rotated at a predetermined angle, the rotational module 900 provides the rotational force to the main lever 300 using the elastic restoring force of the pressing spring 940. Therefore, when the cover 200 is slid, the main lever 300 is automatically rotated, thereby providing convenience in operation.

Hereinafter, the operation of the long stroke tilting hinge module for the portable terminal according to the embodiment of the present invention will be described.

FIGS. 6 and 9a show a state that the cover is disposed on the main body, FIGS. 7 and 9b show a state that the cover is slightly slid to the rear side, and the FIGS. 8 and 9c show a state that the cover is completely slid and tilted and thus the main body is completely opened.

As shown in FIG. 6a, when the cover 200 is disposed on the main body 100, the cover 200 is disposed at the upper side of the main body 100 so as to be parallel with the main body 100.

Herein, as shown in FIG. 6b, the main lever 300 and the sub-lever 400 are arranged to be parallel with each other.

And although the moving shaft 700 is pressed down by the spring 800, the moving shaft 700 is not moved down due to the contact between the support member 600 and the first cam surface 510 of the cam 500 and thus located at an upper end of the moving hole 110.

Further, as shown in FIG. 9a, in the rotational cam 920 of the rotational module 900 coupled to the other side of the hinge coupler 301, a curved portion of the rotational cam surface 921 and a curved portion of the fixed cam surface 931 are arranged to be intersected with each other so that the main lever 300 is not rotated arbitrarily.

As shown in FIG. 7a, when the cover 200 is slid to the rear side, one end of the main lever 300 is rotated backwards, and the cover 200 is jumped to the upper side of the main body 100.

Herein, as shown in FIG. 7b, since the moving shaft 700 and the cam 500 are rotated together with the sub-lever 400 and also always pressed down by the spring 800, the cam 500 coupled with the moving shaft 700 is moved down while being rotated, and thus the support member 600 contacted with the first cam surface 510 is contacted with the second cam surface 520.

As described above, the moving shaft 700 is moved down by the rotation of the cam and disposed at a lower end of the moving hole 110, and thus one end of the sub-lever 400 is moved down.

The one end of the sub-lever 400 which is coupled to the moving shaft 700 is also moved down by a distance corresponding to the moved distance of the moving shaft 700, and thus a space between the cover 200 and the main body 100 is reduced.

Therefore, as shown in FIG. 7a, the jumping space H between the cover 200 and the main body 100 is reduced more than when the cover 200 is rotated in the state that one end of the sub-lever 400 is not moved down.

Further, as shown in FIG. 9b, as the main lever 300 is rotated, the rotational cam 920 is also rotated. Thus the curved portion of the rotational cam surface 921 and the curved portion of the fixed cam surface 931 are contacted with each other, and the fixed cam 930 is slid to the right side while compressing the pressing spring 940.

Then, as shown in FIG. 9c, if the curved portion of the rotational cam surface 921 is missed from the curved portion of the fixed cam surface 931, the fixed cam 930 is slid to the left side by the elastic restoring force of the pressing spring 940, and the rotational cam 920 is automatically rotated.

As shown in FIG. 8a, the main lever 300 and the sub-lever 400 are automatically rotated according to the rotation of the rotational cam 920, so that the cover 200 is slid to the rear side.

And as shown in FIG. 8b, the cam 500 is also rotated according to the rotation of the sub-lever 400, and the support member 600 contacted with the outer surface of the cam 500 is moved from the second cam surface 520 to the first cam surface 520 and thus contacted with the first cam surface 510.

If the support member 600 is contacted with the first cam surface 510, the moving shaft 700 is located at the upper end of the moving hole 110.

When the moving shaft 700 is located at the upper end of the moving hole 110, the one end of the sub-lever is vertically moved up by a distance corresponding to the moved distance of the moving shaft 700.

The moved sub-lever 400 pushes the front side of the cover 200, and thus an opened surface area L of the main body 100 is increased.

That is, a stroke of the cover 100 is increased, and the upper surface of the main body 100 is more opened. Thus, it is possible to increase a size of a keyboard provided at the main body 100.

The other end of the sub-lever 400 is located at a lower side than the other end of the main lever 300, and the cover 200 is tilted forward.

Therefore, as shown in FIG. 8a, the cover 200 is located at the rear side of the main body 100 to be tilted forward, so that the upper surface of the main body 100 is opened. The frictional member 201 is contacted with the support member 101 so as to reduce shock and noise generated by the friction.

Meanwhile, when the cover 200 is slid to the upper surface of the main body 100, the operation is performed reversely.

And if the main lever 300 is rotated at a predetermined angle, the rotational module 900 provides the rotational force to the main lever 300. Therefore, when the cover 200 is slid, the main lever 300 is automatically rotated, thereby providing convenience in operation.

Further, if the cover 200 is tilted by the rotation of the main lever 300, the sub-lever 400 is vertically moved down due to the shape of the cam 500, and a height between the front portion of the cover 200 and the main body 100 is reduced, thereby minimizing the jumping space H. Therefore, when the cover 200 is slid, the inside of the hinge module is not exposed to the outside, and also the cover 200 can be slid smoothly.

And when the cover 200 is completely opened, the sub-lever 400 which is moved down due to the shape of the cam 500 is moved up again, and a sliding distance L of the cover 200 is increased. Thus, the opened surface area of the upper surface of the main body 100 is widened, thereby realizing the long stroke which allows the wider keyboard to be provided on the upper surface of the main body 100.

Further, since the present has the simple structure, it is possible to reduce the assembling processes and the manufacturing cost, and it is also possible to reduce the length and thickness thereof.

As described above, the long stroke tilting hinge module for the portable terminal according to the present invention has some effects as follows:

Since one end of the sub-lever is moved up and down by the cam when the cover is slid, the jumping space of the cover is reduced, and thus the inside of the hinge module is not exposed to the outside.

Since the spring is disposed at the upper side of the moving shaft and the support member is disposed at the lower side of the cam, it is possible to simply arrange the spring which allows the outer surface of the cam to be always contacted with the support member.

When the cover is slid from the upper surface of the main body, the support member is moved from the first cam surface to the second cam surface and contacted with the second cam surface, and thus it is possible to reduce the jumping space formed at the front side of the cover when the cover is tilted.

When the cover is slid and tilted from the upper surface of the main body, the support member is contacted, in turn, with the first cam surface, the second cam surface and the first cam surface, and thus it is possible to reduce the jumping space of the cover. And when the cover is completely opened, the rotational center of the cam which is formed at the one end of the sub-lever is moved up and the other end of the sub-lever pushes the front side of the cover to the rear side of the main body, and thus it is possible to increased the opened surface area of the upper surface of the main body, thereby allowing the larger keyboard.

Since the moving hole is formed at the side surface of the main body, it is possible to easily assemble the moving shaft which is installed in the moving hole.

If the main lever is rotated at the predetermined angle by the rotational module, the rotational force is provided so that the main lever is automatically rotated and thus the cover is semi-automatically opened and closed. And since the rotational center of the cam is located at the front side of the rotational center of the rotational module, it is possible to tilt the cover, and also when the cover is opened, it is possible to provide wider opened surface area of the upper surface of the main body.

While the present invention has been described with respect to the specific embodiments, it will be apparent to those skilled in the art that various changes and modifications may be made without departing from the spirit and scope of the invention as defined in the following claims.

What is claimed is:

1. A long stroke tilting hinge module for a portable terminal, comprising:
- a main body which is formed with an upwardly and downwardly elongated hole-shaped moving hole;
- a cover which is slid and tilted on an upper surface of the main body;
- a main lever of which one end is hinged to the main body and the other end is rotatably hinged to the cover;
- a sub-lever of which one end is hinged to the main body so as to be rotatable and movable up and down and the other end is rotatably hinged to the cover;
- a moving shaft which is inserted into the moving hole so that one end of the sub-lever is hinged to the main body;
- a cam which is coupled to a longitudinal center portion of the moving shaft;
- a support member which is fixed to the main body and disposed at the lower side of the cam and of which an outer surface is contacted with the cam; and
- a spring which is contacted with the moving shaft and which downwardly presses the moving shaft toward the support member,
- wherein the cam comprises a first cam surface which is formed into a curved shape and a second cam surface which is extended from the first cam surface and formed into a curved shape having a smaller diameter than the first cam surface, and
- the first cam surface is contacted with the outer surface of the support member when the cover is disposed at the upper side of the main body, and
- when the cover is slid to the rear side of the main body, each one end of the main lever and the sub-lever and the cam are rotated in one direction, the second cam surface is contacted with the outer surface of the su ort member and the moving shaft is moved down along the moving hole together with one end of the sub-lever by elastic force of the spring, thus a jumping space of the cover is reduced.

2. The long stroke tilting hinge module of claim 1, wherein, when the cover is slid to the rear side of the main body and a front portion of the cover is passed through a maximal jumping space upon sliding of the cover, the cam is rotated in one direction and the first cam surface is contacted with an outer surface of the support member, thus one end of the sub-lever is moved up and an opened surface of the main body is increased.

3. The long stroke tilting hinge module of claim 1, further comprising a rotational module which is installed at one end of the main lever so as to provide rotational force to the main lever when the main lever is rotated at a desired angle or more, wherein the rotational module comprises:
- a housing which is fixed to the main body;
- a rotational cam of which one end is fixed to one end of the main lever and the other end is rotatably inserted into the housing and formed with a corrugated rotational cam surface;
- a fixed cam which is installed at the housing so as to be slid left and right and formed with a corrugated fixed cam surface engaged with the corrugated rotational cam surface; and
- a pressing spring which is installed at the housing and of which one end is contacted with the housing and the other end is contacted with the fixed cam so as to elastically press the fixed cam toward the rotational cam, and
- wherein, when one end of the main lever is rotated together with the rotational cam at a desired angle or more in one direction, the rotational force is provided to the main lever and the rotational cam by the elastic force of the pressing spring and phase difference between the rotational cam surface and the fixed cam surface.

\* \* \* \* \*